United States Patent
Matlock

[11] Patent Number: 5,887,380
[45] Date of Patent: Mar. 30, 1999

[54] LURE ENHANCER

[76] Inventor: Gary D. Matlock, 44 W. Rachel, Bixby, Okla. 74008

[21] Appl. No.: 862,061

[22] Filed: May 22, 1997

[51] Int. Cl.[6] .................................................. A01K 91/00
[52] U.S. Cl. ............................................................. 43/42.74
[58] Field of Search ............................... 43/42.72, 42.74, 43/43.15, 44.84

[56] References Cited

U.S. PATENT DOCUMENTS

| | | | |
|---|---|---|---|
| 1,352,979 | 9/1920 | Lawrence | 43/42.74 |
| 2,157,003 | 5/1939 | Mussina . | |
| 2,274,131 | 2/1942 | Edberg . | |
| 2,589,715 | 3/1952 | Lysikowski | 43/42.74 |
| 2,791,060 | 5/1957 | Kender . | |
| 3,137,962 | 6/1964 | Linley, Sr. . | |
| 3,646,700 | 3/1972 | Pond | 43/42.74 |
| 3,703,047 | 11/1972 | Schevnavar et al. | 43/43.15 |
| 3,991,505 | 11/1976 | Simeti | 43/42.74 |
| 4,671,007 | 6/1987 | Stanczyk | 43/42.74 |
| 5,664,365 | 9/1997 | Walden | 43/44.82 |

*Primary Examiner*—Thomas Price
*Attorney, Agent, or Firm*—Robert E. Massa

[57] ABSTRACT

A fishing lure enhancement device comprises a weighted body having an attachment member at a first end providing for attachment of fishing tackle to the body. A wire-like leg member has a first end thereof secured at a second end of the body, and the leg member has a loop portion adjacent the second end of the body. The leg extends at a 90 degree angle from the longitudinal axis of the body and the leg is at least as long as the longitude of the body. The leg has means for attaching fishing tackle at a second end thereof. Thus, the length and direction of attachment of the leg permit attachment of fishing tackle of various characteristics to the leg and to the attachment member on the body while providing non-interfering operation of the entire apparatus.

16 Claims, 3 Drawing Sheets

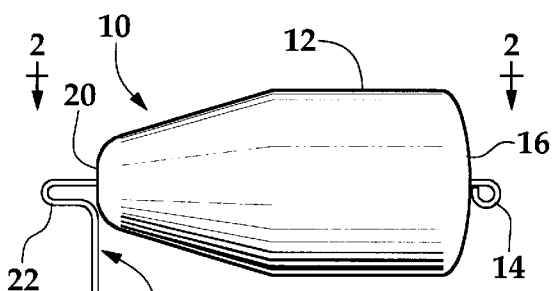
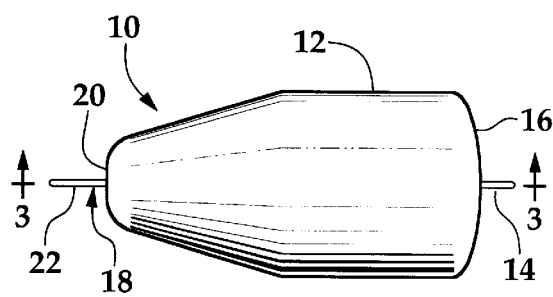
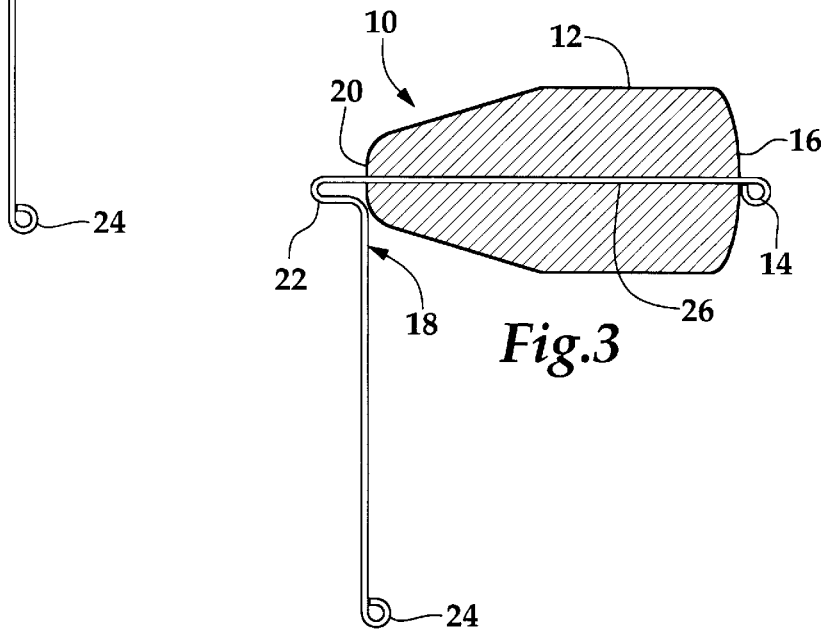
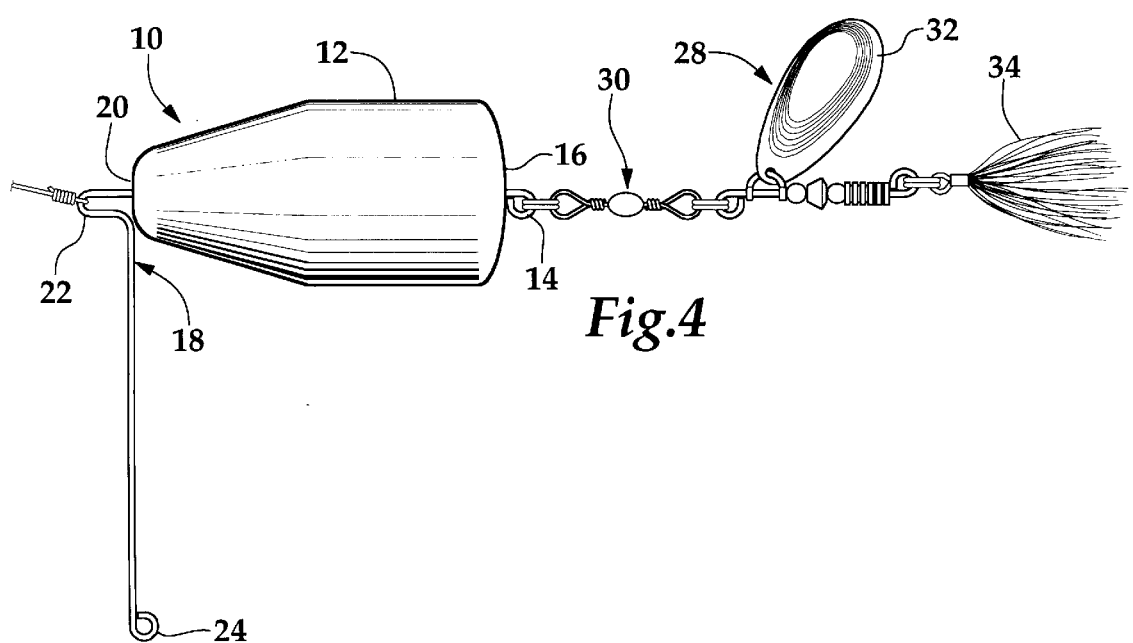

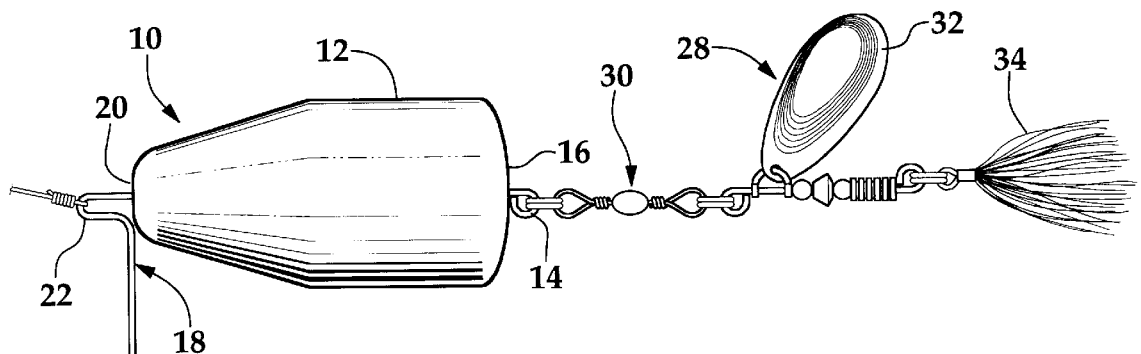
*Fig.5*
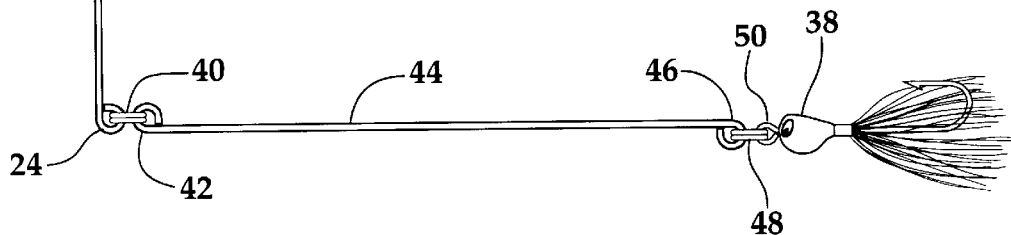
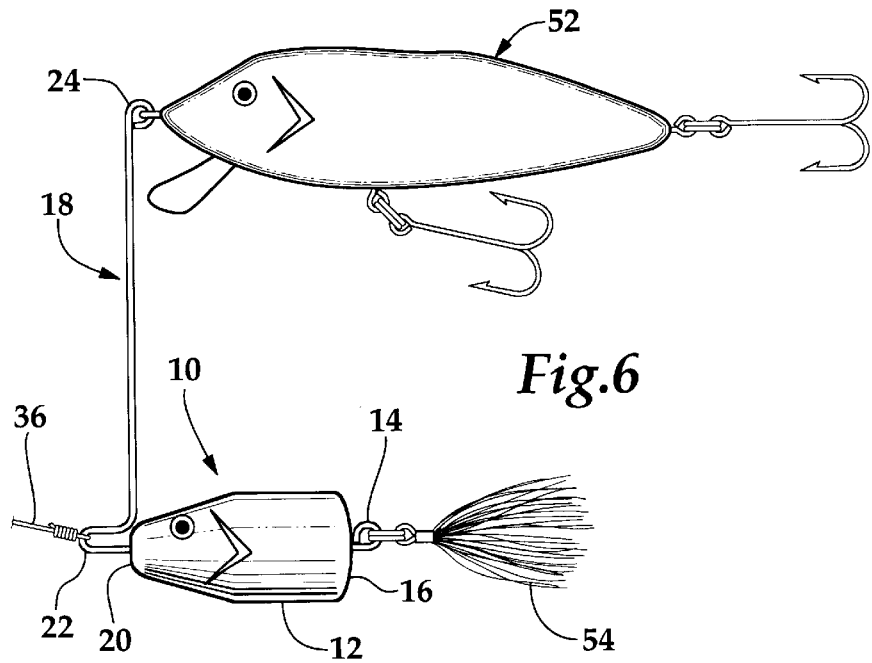
*Fig.6*

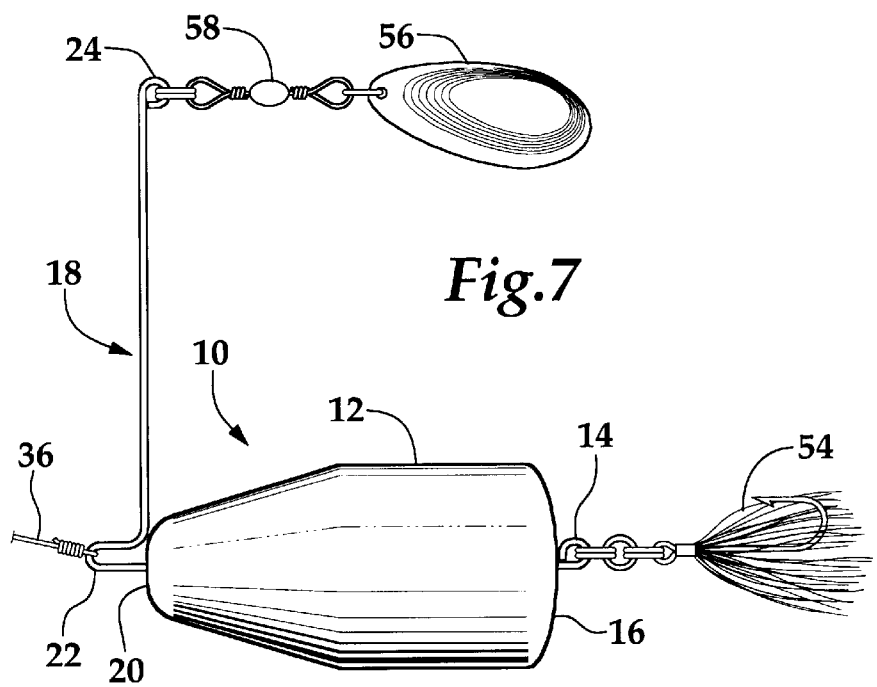
Fig.7
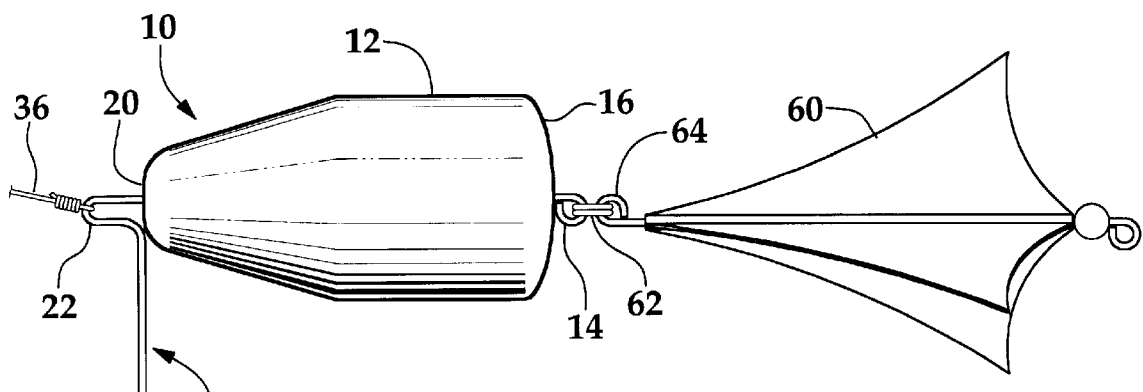
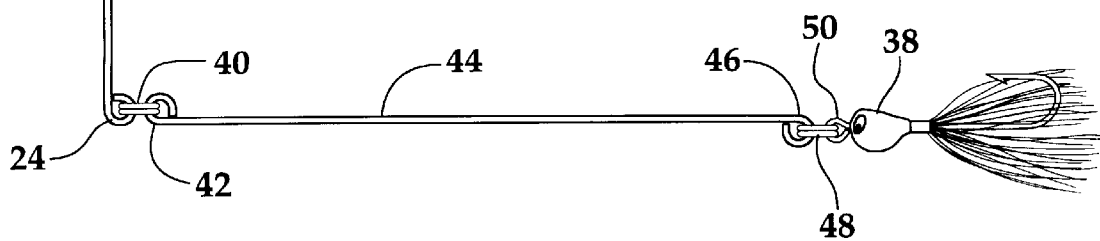
Fig.8

LURE ENHANCER

FIELD OF THE INVENTION

My invention relates to a fishing lure device which enhances the use, adaptability, and operation of a fishing lure by providing for enhancement of the operation, effect, appearance, and efficiency of fishing tackle attached to a basic component, or body, of the fishing lure apparatus. More particularly, my invention relates to a fishing lure device which may have two or more fishing equipment components of similar or different design and operating characteristics attached to the basic component of the lure and still assure each individual member of retaining, unimpededly, its own unique attractiveness. Still more particularly, my invention relates to a fishing lure system in which I have designed the primary components of the device so that I may attach fishing tackle of different types to the basic component and thus enhance or even vary the operating characteristics of the individual fishing tackle components, depending upon the manner of attachment to the basic component.

BACKGROUND OF THE INVENTION

Fishing has been one of our oldest activities, originating as a need to gather food of a tasty and beneficial kind from a source of fish which might be easily available. Early man used in the beginning a crude bone or wood object, pointed at each end, attached to a line, and smeared with some form of attention-raising bait. A fish was expected to swallow this article and would be pulled out of the water.

Eventually, ancient man began to indulge in fishing also as a form of pleasure or recreation. Then fishing developed into the form of recreational fishing, generally referred to today as "sport fishing", enjoyed by the individual man, and large-scale fishing, or commercial fishing, practiced by a group, or business entity, organized to gather large numbers of fish for sale to the citizenry.

As man's interest in sport fishing arose, he became increasingly adept at designing new and improved fishing tools, soon to be known as "fishing tackle".

Consequently, as man's interest in fishing, or "angling", increased, he developed better fishing equipment, and as he developed better fishing equipment, his interest grew even more.

The invention of a fishing reel permitted the use of a longer line. Then fish hooks were made more efficient, and fishing rods were increasingly improved.

The ancient fisherman soon began using artificial lures on the fishing line as he found these could successfully attract fish. Throughout history the design and manufacture of artificial lures improved and became particularly specific as the habits of the various species of fish became better known. The fisherman attempted to use artificial lures which would appear most attractive to the fish he was seeking.

The fisherman knows generally the habits of his chosen fish: the fish's preferred food, whether it is a predatory fish, how it responds to temperature conditions, and the kind of water and the depth at which it may be found.

Despite excellent knowledge of the habits of the various fish species, the fisherman must know whether the weather conditions at that particular time would cause the fish to respond any differently than normal to the bait being used.

However, even with the knowledge of a particular fish's habits, I found it exceedingly beneficial to be able to alter the appearance and activity, or "enhance", the action of an artificial lure commensurate with the change I felt that fish's habits for that particular time might be.

In accordance with the usual procedure, I have conducted a patent search which revealed the following patents which were considered to be the closest to my invention:

| U.S. Pat. No. 1,352,979 | Lawrence | Sept. 14, 1920 |
| U.S. Pat. No. 2,589,715 | Lysikowski | March 18, 1952 |
| U.S. Pat. No. 3,646,700 | Pond | March 7, 1972 |
| U.S. Pat. No. 3,991,505 | Simeti | Nov. 16, 1976 |
| U.S. Pat. No. 4,671,007 | Stanczyk | June 9, 1987 |
| U.S. Pat. No. 4,920,687 | Barnett | May 1, 1990 |

U.S. Pat. No. 1,352,979 to Lawrence describes a fish line spreader used for supporting a plurality of fish hooks from a single line. The spreader comprises a body portion from which a plurality of arms extended laterally. The body is formed of 2 parts, an upper portion and a lower portion, between which the long arms are held. In proper position, the inner ends of the arms are positioned in grooves of one body portion and the 2 body portions are held firmly together by a central screw. For storage, the 2 body portions are released and the arms are removed from their grooves then swung into parallel arrangement in the same plane for compact storage.

U.S. Pat. No. 2,589,715 to Lysikowski describes a fish line sinker comprising a heavy body member mounted upon a wire strand with a yoke at a first end of the wire strand engaging loosely an eye member of one arm of a wire yoke attached to a fish line. The wire strand which passes centrally through the body extends for a distance beyond the second end of the body, so that in use the extended wire strand passes over any obstruction on the bottom of the water bed.

U.S. Pat. No. 3,646,700 to Pond describes a take-apart fish hook or line support somewhat similar to the spreader of Lawrence. The lure support includes a weighted body member having wire arms connected thereto and extending in a plurality of lateral directions plus a vertically depending wire arm. The lure support is designed to be easily assembled and disassembled. The central body member comprises 3 parts, each part having an elongated arm secured to it, that is, the two laterally extending arms and the vertical arm. For easy storage the three body parts with their respective arms are taken apart, and may then be stored together in a parallel manner.

U.S. Pat. No. 3,991,505 to Simeti describes a fishing spreader connector comprising a flat, plastic, rectangular central member having a connecting eye for attachment of a spreader, and a line loop and a sinker loop for loose connection of a line and a sinker. The line loop and the sinker loop each has a flexible free end which may be held in secure position on the central body portion by catch elements which form latch means with the body portion after attachment of the line and sinker over their respective catch elements.

U.S. Pat. No. 4,671,007 to Stanczyk describes a V-shaped wire fishing lure connector and its method of manufacture. The fishing lure connector comprises a V-shaped wire structure being bent in the form of a figure eight at the point of the V to provide for attachment of a fishing line with one eye of the figure eight and attachment of a fishing swivel with the other eye of the figure eight. An eyelet is formed at each end of the V-shaped wire for attachment of lures.

U.S. Pat. No. 4,920,687 to Barnett describes a rotating fishing lure spreader for use while trolling. The spreader provides for the attachment of a plurality of hooks. The basic body member is a triangular planar member having means for attachment to a fishing line at a first of the triangular points, attachment of lures at the other two triangular points, and attachment of a lure at an eye at the central point of the trailing edge. Two vanes extend in opposite directions from the trailing edge to provide suitable rotation of the spreader during use.

SUMMARY OF THE INVENTION

The primary object of my invention is to provide a fishing lure which is efficient, easy to manufacture, and simple in construction.

Another object of my invention is to provide a fishing lure of components which may be easily and quickly assembled, and will be easy to operate.

Still another object of my invention is to provide a fishing lure in which a component thereof enhances the operation and movement of the lure during use thereof.

Still another object of my invention is to provide a fishing lure which is an assemblage of lure components which operate conveniently together without interference between the different components.

Still another object of my invention is to provide a lure which includes lure components assembled in a manner that the temptation of fish to the lure is greater than what would be the total temptation to the sum of the individual lure components.

In using a fishing lure enhancement device according to my invention, the fisherman may choose the depth at which he desires the lure components to move, rather than have the lure design dictate the depth at which he must fish.

Also, in using the lure enhancer of my invention, the fisherman is able to modify the action of the lure or combination of lures he is using.

The fisherman may also use a wide variety of artificial lures, particularly if he finds that a certain combination of lures provides an action that he might prefer.

With my invention, the fisherman is able to fish with a lure enhancement device to which he may attach a variety of lure members to provide an action he wants and still be assured that the attached lure components will not interfere with each other.

Since most fish are predatory, the fisherman may now easily assemble a convincing combination of lures that will attract the desired fish. For example, he may devise a combination of lures that will give a realistic illusion of a small fish pursuing some other form of bait. It appears that a certain combination of lures provides a rather realistic action of a minnow, probably more realistic and appealing to the game fish than simply a dead minnow otherwise used as bait.

The fisherman may assemble a combination of lures that will resemble the favorite live food of the particular game fish he is seeking. An action may now be easily modified or enhanced.

Furthermore, if the fisherman prefers a combination of lures and components to produce a noise or motion which would represent the action of a favorite live food of that particular game fish, the fisherman may easily form such a combination of components, again with the assurance that the action provided would not be reduced or inhibited by any interference between any operating components.

As a result of my long experience and enjoyment with sport fishing, my idea for my lure enhancement device developed from a desire to design a bass jig encompassing the action I had in mind.

I wanted to enhance the free movement of a spinner blade on a wire arm and enhance the vibration which I knew spinner blade would have.

I soon learned that a weight positioned directly behind the reel line tie enhanced the vibration created by the blade. You cannot achieve this movement with the weight positioned at the back of the wire arm next to the spinner blade.

I then experimented with many different lures held in numerous positions. I tried the standard "V" design of a spinner bait with a weight attached. This worked with some lures, but not all. Larger, wide-bodied lures did not operate efficiently on the "V"-shaped wire design with a weight attached because the size of the lure prohibited a free action, or non-interfering action of a lure with the weight.

Finally, I reached what I considered a successful development of my invention.

Basically, the lure enhancement device, to be successful, required an arm extending at substantially a 90 degree angle from the longitudinal axis of a weighted body member, with the arm extending for a considerable distance from that axis.

The weighted body member is not spherical, but rather somewhat elongated and generally rounded about the axis, and having an ellipsoidal nose to which the fishing line may be attached.

I have designed the arm, or leg member, to be secured to the body member in a manner that, adjacent the nose of the body member, the leg member forms a loop, or eye, for attachment of the fishing tackle, or line, and then extends laterally from the body member at the aforesaid 90 degree angle. The leg member includes an eye member at the extended end therefor for attachment of the desired lure. Then, at the end, or tail of the body member, I have provided an attachment member, such as an eye, for attachment thereto of the desired fishing lure component, fishing tackle, or other fishing component the fisherman might desire.

I have proposed, for ease of manufacture, that the wire arm, or leg component, should be positioned within and through, the body member, along the longitudinal axis of the body, and include the attachment member at the tail of the body, and the loop at the nose of the body, then extending laterally.

The wire arm, or leg, should extend from the longitudinal axis of the body member for a distance at least as long as the longitudinal axis of the body member. Thus, the lure enhancement device could involve body members of different sizes, with those contributory designs relative to the relationship of the longitudinal axis and leg member.

I have designed the lure enhancement device of my invention to permit the angler to make the following choices:

1. Select the type and kind of lures, baits, etc. which he chooses.
2. Choose the amount and type of action he wishes to display with his lures.
3. Choose the type of balance he wishes to provide by the number and kinds of lures he wants to use.
4. Choose the depth at which he wishes to fish, even with the ability to modify the action of a known lure.
5. Provide an enhanced action to the lure components he wishes to use.
6. Be assured of the stability of movement to the lures which he chooses which would be otherwise unstable.

I shall subsequently describe in detail other major features of my lure enhancement device.

In the examples I shall show just a few of the many choices and combinations of lures my invention provides the fisherman. The fisherman may devise a combination which he considers most appropriate for the conditions under which he wishes to fish, as to water conditions, weather conditions, presence of brush, presence of rocks, flow of water, and type of fish he is hoping to catch.

Then, the above objects and advantages of my invention will become apparent from my description of the following preferred embodiments of my invention.

BRIEF DESCRIPTION OF THE DRAWINGS

FIG. 1 is a side view of a lure enhancement device according to my invention.

FIG. 2 is a top view of a lure enhancement device according to my invention.

FIG. 3 is a side sectional view of a lure enhancement device according to my invention along the lines 3—3 of FIG. 2.

FIG. 4 is a side view of a lure enhancement device according to my invention having a type of spinning lure attached thereto to show effective action.

FIG. 5 is a side view of a lure enhancement device according to my invention having two different types of lures attached thereto to show effective action.

FIG. 6 is a side view of a lure enhancement device according to my invention having two further different types of lures attached and showing a further modified action of the device.

FIG. 7 is a side view of a lure enhancement device according to my invention having two still further different lures attached thereto show a further modified action of the device.

FIG. 8 is a side view of a lure enhancement device according to my invention having two still further lures attached thereto to show a further modified action of the device.

DESCRIPTION OF THE PREFERRED EMBODIMENTS

In the side elevational view of FIG. 1 I describe a lure enhancement device 10, generally, comprising a weighted body member 12 of the configuration I had described above.

In FIG. 1 I describe an attachment member 14 positioned adjacent a first end 16 of the weighted body member 12.

Attachment member 14 is a form of eye component to which the fisherman may attach fishing tackle components as he chooses. A leg member 18, generally, is secured at a second end 20 of body member 12. Adjacent the end 20 of body member 12, the leg member 18 includes a loop portion 22 to which the fisherman may attach his fishing line. The leg member 18 includes a means for attaching fishing tackle at the second end of the leg member described by an eye member 24.

As I outlined above, for ease of manufacture and efficiency, the leg component 18, generally, should be in the form of a wire-like member having one arm thereof positioned along the longitudinal axis of the body member 12 and formed to include the attachment member 14 and loop portion 22. This I show by the arm 26 in the sectional view of FIG. 3, as it would be molded into a metallic body member, such as a body formed of lead.

FIG. 2 is a top view of the lure enhancement device 10 showing one form of symmetrical arrangement of the body member 12, attachment member 14, and leg member 18, generally.

The design of the weighted body member 12 and leg member 18 permits the fisherman to use a variety of fishing tackle components and lure components because the length of the leg components, means of attachment, and 90 degree angle of the leg component from the axis of the body member, while assuring him a wide combination of components, will perform as he expects without having interference from components attached to the angularly extended leg member. The weighted body member can be particularly helpful in providing weight where needed, balance or variety in coordination with the type of lure, swivel, or blade being used, as well as being especially inducive to the fisherman to form his own combination, knowing that there will be no interference by those components.

As I suggest in the drawings, the lure enhancement device 10 may be easily combined with other components in order to give an illusion of a predator/prey relationship moving through the water to provide added inducement to a large predatory fish. Of course, the fisherman may also decorate the body member as he wishes if he believes a particular decoration would be especially attractive.

When used with different kinds of lures and fishing tackle, my lure enhancement device 10 will give the combination different characteristics, as I show in FIGS. 4, 5, 6, 7, and 8. Certain kinds of lures will travel above the lure enhancement device 10 upon retrieval; other kinds of lures will travel below the lure enhancement device upon retrieval; and any type of lure may be attached directly behind the lure enhancement device 10 as I show in FIG. 4.

The fisherman may choose to enhance, or modify, the usual action of the fishing tackle or lures he is using. He will be able to fish a top water lure or shallow water lure at depths to which they are not customarily used.

In FIG. 4 I show a spinner 28, generally, attached by means of a swivel connection 30, generally, to attachment member 14, at the end of the body member 12. The spinner 28 comprises a spinner blade 32 and a feather component 34. I have found that this order of attachment, of the lure enhancement device 10 to the fishing line 36 and spinner 28 to the lure enhancement device 10, enhanced the vibration created by the blade 32 as this combination was being retrieved.

In FIG. 5 I describe another version of lure attachment for my lure enhancement device 10. I show a jig component 38 conveniently attached to another lure system, such as might be suggested above, by cooperation of a split ring connector 40, eye 42 of hinge arm 44, eye 46 of hinge arm 44, split ring connector 48, and eye 50 of jig 38.

The combination shown in FIG. 5 combines the action features of a spinner apparatus with the action features of a jig component.

The hinge system provides a desirable balance to the total apparatus because of the ability to move unrestrictedly upon retrieval. The combination of a spinner and jig provides a different type of vibration and appearance to the lure system.

I describe another variation of the lure system in FIG. 6 by attachment of a buoyant type lure 52, generally, with the lure enhancement device 10. In this arrangement, the buoyancy of the lure 52 causes the buoyant lure 52 to float above the weighted body member 12, which provides another type of predator/prey adornment for the system. In FIG. 6 I also show a small additional lure 54 attached to the attachment member 14 of the lure enhancement device 10, which may provide added features as the fisherman desires.

In FIG. 7 I describe still another type of lure system. I show a small blade member 56 attached by a swivel connection 58, generally, to eye member 24 of the lure enhancement device 10. The use of the swivel connection provides free movement to the smaller blade component and the lure combination will move through the water in the arrangement as shown.

In the arrangement shown in FIG. 8, I describe a combination of a buzz blade 60 attached to the lure enhancement device 10 by means of a split ring connection 62 connecting attachment member 14 and eye 64 of the buzz blade 60. For further variation I show this combination in FIG. 8 as including jig component 38.

Thus, with the components provided by lure enhancement device 10, the system offers numerous varieties to the angler; the ability to select the depth at which he desires the lure components to travel and the type of action he wishes, rather than having a lure design dictate the action he must expect and use.

Since many different embodiments of my invention may be made without departing from the spirit and scope thereof, it is to be understood that the specific embodiment described in detail herein are not to be taken in a limiting sense, since the scope of the invention is best defined by the appended claims.

I claim:

1. A fishing lure enhancement device, comprising:

a weighted body member having a longitudinal axis, an attachment member secured at a first end of said body adaptable for attachment of fishing tackle, a leg component having a first end secured to said body, including a loop portion adjacent a second end of said body, said leg component extending at substantially a 90 degree angle in relation to the longitudinal axis of said body, said leg component having a length at least as long as the longitude of said body, and said leg component having means for attaching fishing tackle at the second end thereof, whereby the length and direction of the leg component provide for contemporary attachment and operation of fishing tackle of various operable characteristics to said leg component and to said attachment member while permitting non-interfering operation of said fishing tackle.

2. A fishing lure enhancement device as described in claim 1, wherein:

said attachment member comprises an eye component.

3. A fishing lure enhancement device as described in claim 2, wherein:

said eye component includes an eye member.

4. A fishing lure enhancement device as described in claim 3, wherein:

said means for attaching fishing tackle at the second end of said leg member includes an eye member.

5. A fishing lure enhancement device as described in claim 4, wherein:

the leg component includes a second leg component secured within said body, and said second leg component is positioned substantially along the longitudinal axis of said body.

6. A fishing lure enhancement device as described in claim 5, wherein:

said second leg component includes said attachment at the first end of said body.

7. A fishing lure enhancement device as described in claim 6, wherein:

said first and second leg components are unitary and are of wire-like material.

8. A fishing lure enhancement device as described in claim 7, wherein:

said second leg component is molded within said body.

9. A fishing lure enhancement device as described in claim 8, wherein:

a hinge component is attached to said eye member of said leg member, and said hinge component includes means for attaching fishing tackle thereto.

10. A fishing lure enhancement device as described in claim 8, wherein:

a swivel member is attached to said eye member of said leg member, and said swivel member provides means for attaching fishing tackle thereto.

11. A fishing lure enhancement device as described in claim 4, wherein:

a first fishing tackle component is attached to the eye member at the second end of said leg member, and a second fishing tackle component is attached to the eye member of said attachment member.

12. A fishing lure enhancement device as described in claim 4, wherein:

a hinge component is attached to said eye member of said leg member, and said hinge component includes means for attaching fishing tackle thereto.

13. A fishing lure enhancement device as described in claim 4, wherein:

a swivel member is attached to said eye member of said leg member, and said swivel member provides means for attaching fishing tackle thereto.

14. A fishing lure enhancement device as described in claim 1, wherein:

a first fishing tackle component is attached to the second end of said leg component, and a second fishing tackle component is attached to said attachment member.

15. A fishing lure enhancement device as described in claim 1, wherein:

a hinge component is attached to said leg component at said end thereof, and said hinge component includes means for attaching fishing tackle thereto.

16. A fishing lure enhancement device as described in claim 1, wherein:

a swivel member is attached to said leg component at said second end thereof, and said swivel member provides means for attaching fishing tackle thereto.

* * * * *